May 12, 1936.   A. PERON   2,040,102
POT
Filed Jan. 22, 1935
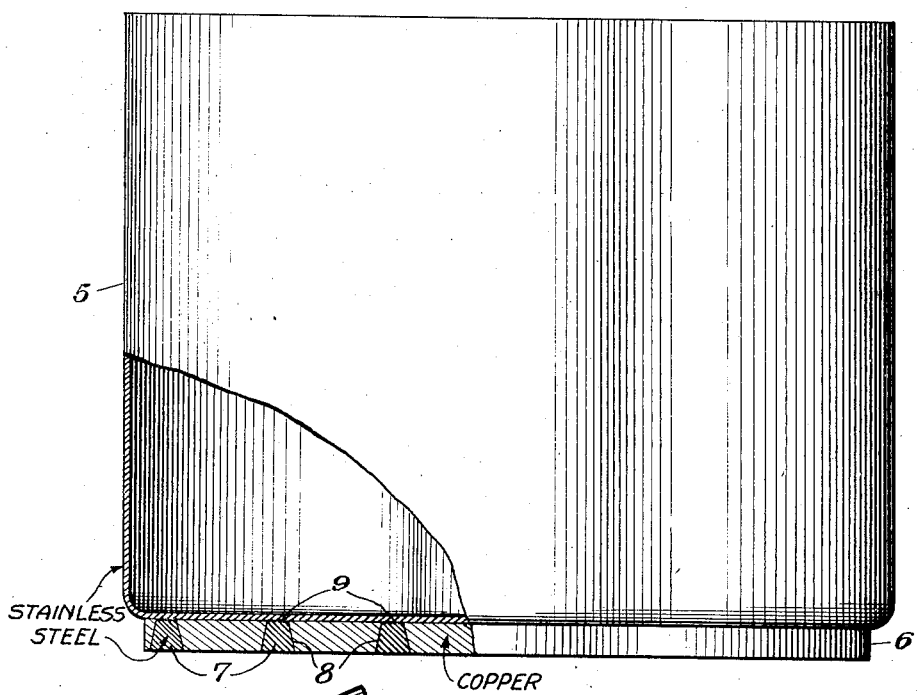
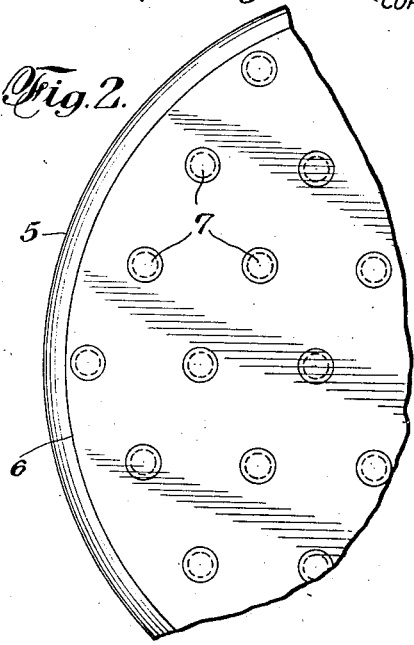
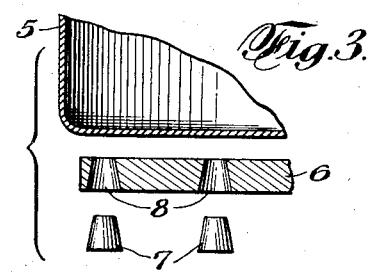
INVENTOR
*Anthony Peron*
BY
ATTORNEY Patented May 12, 1936

2,040,102

UNITED STATES PATENT OFFICE 2,040,102

POT

Anthony Peron, New York, N. Y.

Application January 22, 1935, Serial No. 2,878

6 Claims. (Cl. 53—8)

This invention relates to cooking utensils generally.

The objects of the invention are to provide a cooking utensil which will not stain, corrode or rust, which can be easily kept bright and clean and which will be efficient and practical as regards heat conductivity.

It has been proposed heretofore to construct cooking vessels of so-called rustless steel. Because of the poor heat conductivity of this metal, these have not been satisfactory. It has been proposed also to coat or cover such vessels with a metal of better conductivity. So far as known however, these have not been satisfactory because of the inability heretofore to secure the heat conducting layer in sufficiently intimate and permanent contact with the metal of the pot or pan.

In the present invention, these faults are overcome and the objects above set forth are attained by using a stainless steel, such as that known as "Allegheny metal" for the body of the pot and securing a copper or other good heat conducting plate to the bottom of the pot by preformed rivets or studs of the same metal as the pot, said studs being tapered and having their smaller ends welded to the pot bottom under pressure sufficient to cause them to hold the plate intimately and firmly united to the pot bottom.

These and other novel features of the invention will be more fully appreciated by reference to the accompanying drawing illustrating a practical embodiment of the invention.

Fig. 1 in the drawing is a side elevation and part broken sectional view of a pot in which the features of the invention are combined.

Fig. 2 is a broken plan view of the pot bottom and attached heat collecting plate.

Fig. 3 is a broken sectional detail showing a portion of the pot bottom, part of the heat collecting plate ready for attachment thereto and two of the performed tapered rivets or studs ready to enter the correspondingly tapered seats in the plate.

The pot, indicated at 5, may be of any size or shape suited to the purpose for which it is to be used. Because of the reinforcing effect of the plate, the pot body may be of relatively light or thin gage metal, which is an advantage because of the saving in the relatively expensive metal stainless steel.

The heat collecting plate 6, may be copper or similar good heat conductive metal and, as indicated, this may be relatively thick as compared with the wall thickness of the pot. This plate is shown as flat and smooth to match the flat smooth bottom of the pot and so that there shall be actual contact between the two at all points.

The preformed tapered rivets or studs are designated 7. These are of stainless steel, which will weld to the pot bottom.

The seats or openings 8, in the heat collector are the same or substantially the same taper as the securing pins or studs and the parts are arranged with the smaller ends of the studs toward the pot bottom.

The actual welds between the smaller ends of the studs and the pot bottom are indicated at 9, in Fig. 1. In making these welds, sufficient pressure is applied to force the tapered studs firmly home in their tapered seats and firmly engaged with the bottom wall of the pot. In practice it has been found best to place these welded rivets or studs fairly close together, as a typical example, with a spacing of one inch between centers. This, as will be clear from Fig. 1, holds and confines the collector metal between rivets, so that it can not arch away from the pot bottom, the taper of the pins having the effect of crowding the metal more closely against the bottom with expansion under heat.

The tapered studs engaged as they are full length in the tapered seats, hold just as firmly regardless of wear of either the bottom plate or the exposed rivet ends. Thus the plate cannot come loose from long continued wear or harsh treatment. If desired, the exposed ends of the studs may be protected by a cover plate or these studs may be sunk in the collector metal, as by casting the plate about the same, leaving the smaller ends exposed for welding to the pot bottom.

Cold rolled copper has been found to be the best metal for the heat collector and a stainless steel such as known as "Allegheny metal" or "crucible steel" or "Resistol K2" has been found to be the best metal for the pot. The copper plate may be of $\frac{1}{16}$" thickness or more. For average use, a thickness of ¼" has been found satisfactory.

The rivets or studs have a length substantially corresponding to the thickness of the plate and a taper corresponding to the taper of the holes in the plate. This taper for example for a ¼" thick plate may be from ⅜" at the larger end to ¼" at the smaller end. This particular relation has been found quite desirable that is, in particular with the smaller end of the rivet equal in diameter to the thickness of the plate, or stated in other words, the rivet being as long as the diameter of its smaller end.

Actually the tapered rivet may be slightly larger than the tapered seat or slightly shorter than the thickness of the plate, so that after it is seated in the plate some pressure on the rivet will be required to bring its smaller end actually in contact with the pot bottom. This insures that the rivet be firmly and tightly seated in the opening provided for it in the plate before the actual welding takes place. The rivet then, as it becomes fused to the pot bottom, actually forms a clamp squeezing the metal of the plate against the pot bottom. In cooling, a certain shrinkage may occur which will further set the plate against the pot bottom.

Care should be exercised that both the bottom and the plate are absolutely flat and plumb, so that there will be true surface contact between the two and so that butter or other substances melted in the pot will flow smoothly and equally over the bottom surface preventing unequal heating effects and burning of materials.

The preformed tapered rivets form a permanent connection between the pot and collector, which will hold regardless of scraping and the wearing away of the surface over a stove or the like. Thus the collector may wear down to a thin layer, but the tight fit of the rivets for their full length assures that the plate is equally held at every thickness it may be worn down to. Thus the tapered rivets will hold regardless of wear, whereas a straight rivet simply headed over at the lower end would let go as soon as the exposed head portion of such a rivet was worn off.

To assure an absolute flat fit of the rivets in their tapered seats, the openings are preferably punched out to exact size, all alike. This leaves no burrs, such as might be left by drilling or reaming these holes.

The unlike metals, stainless steel and sheet copper can not be brazed or soldered together. The copper can not be spot welded to the stainless steel but the preformed conical rivets are the same metal as the pot, make perfect welds and these stainless steel rivets will not rust or corrode during the life of the article.

To prevent discoloration of the Allegheny metal or other stainless steel, each weld may be immediately followed by a quick spray of water about or through the electrode at the inside of the pot.

In practice, the rivets may be set under light pressure in their tapered seats in the plate, with the inner, smaller ends not quite flush with the inner face of the plate. Then in the welding press, sufficient pressure may be applied to the outer larger head of the rivet to force it inward to a final seat and to bring the inner end then into contact with the pot bottom. While thus held under pressure, the welding current is thrown on fusing the smaller inner end integrally to the pot bottom and immediately this is effected, the current is automatically cut off and the spurt of cooling water applied to prevent discoloration of the stainless steel at the inside of the pot.

What is claimed is:

1. A pot of stainless steel, a heat collector of copper on the bottom of the same and preformed rivets of stainless steel for securing said copper heat collector to the bottom of said stainless steel pot, the heat collector having frustro conical openings disposed with the smaller ends toward the pot bottom and the rivets being of corresponding frustro conical shape, closely fitting in said openings and having their smaller ends welded to the pot bottom.

2. A metal pot, a heat collector applied thereto and rivets of substantially the same material as the pot extending through said collector and welded to said pot, said collector having openings therethrough tapered toward the pot bottom and said rivets being preformed in correspondingly tapered shape and closely fitting said openings and having their inner smaller ends welded to the pot.

3. In combination, a metal pot, a plate of different metal applied to the bottom of the same and preformed tapered rivets having engagement throughout their length in said plate and welded at their smaller ends to said pot bottom.

4. A metal vessel having an absolutely flat bottom, a flat collector plate in true surface engagement with said flat bottom of said metal vessel, said plate having tapered passages arranged with the smaller ends toward the pot bottom and preformed correspondingly tapered plugs seated in said tapered passages and having their smaller ends fused to said bottom.

5. A metal pot of stainless steel, a plate of copper or the like applied to the bottom of the same and studs extending through said plate and welded to the bottom of the pot, said studs having a diameter at the points of welds substantially equal to the thickness of the plate and said studs being preformed in tapered shape and having the smaller ends of the same welded to the pot bottom.

6. In combination with an article in the nature of stainless steel and a member of different material in intimate surface contact therewith, rivets preformed in conical shape separate and distinct from said metals and of a metal substantially corresponding to the metal of the first mentioned article, said member having conical openings therethrough substantially corresponding in size and shape to the preformed conical rivets and disposed with the smaller ends of the same toward said article and said preformed conical rivets being seated in fully contacting engagement in said conical openings with their inner smaller ends abutted and welded to said article.

ANTHONY PERON.